No. 764,350. PATENTED JULY 5, 1904.
A. CIOLFI.
APPARATUS FOR MEASURING THE DURATION OF COMBUSTION OF POWDERS.
APPLICATION FILED JAN. 29, 1904.
NO MODEL. 5 SHEETS—SHEET 1.
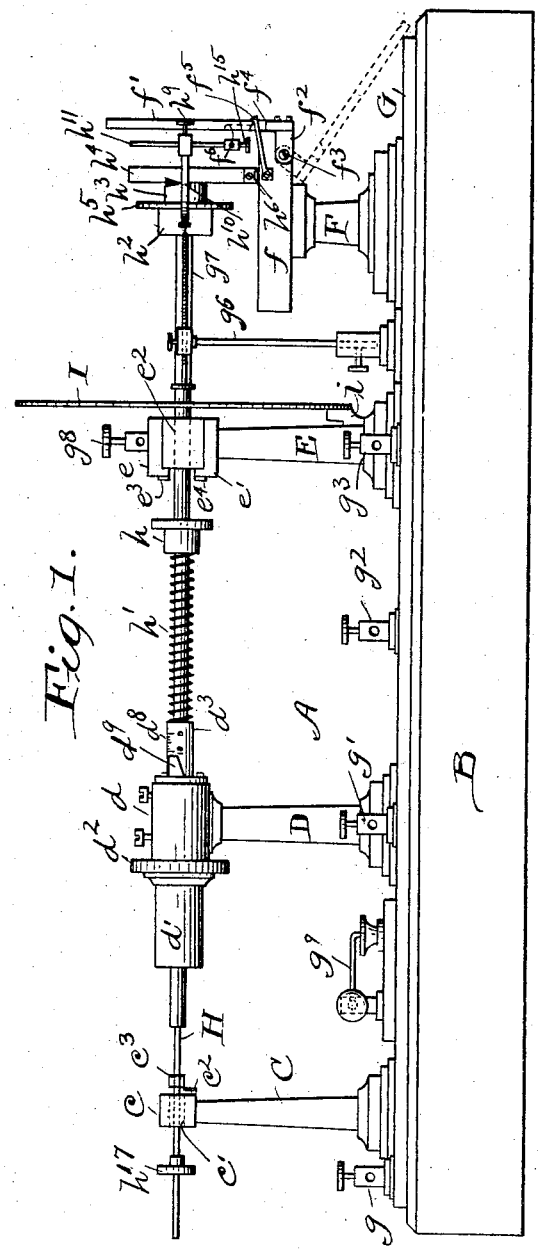
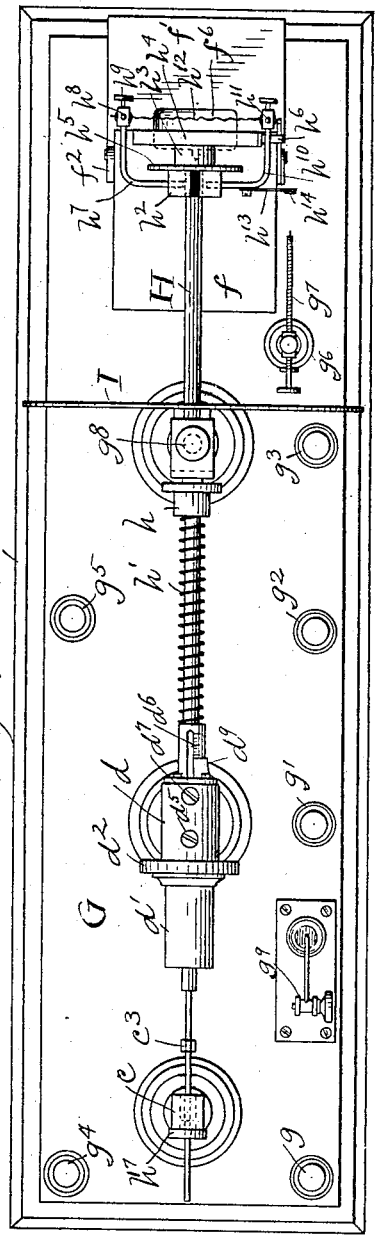
Witnesses:
A. L. Lord
E. B. Gilchrist
Inventor.
Antonino Ciolfi
By Thurston & Bates
his attorneys

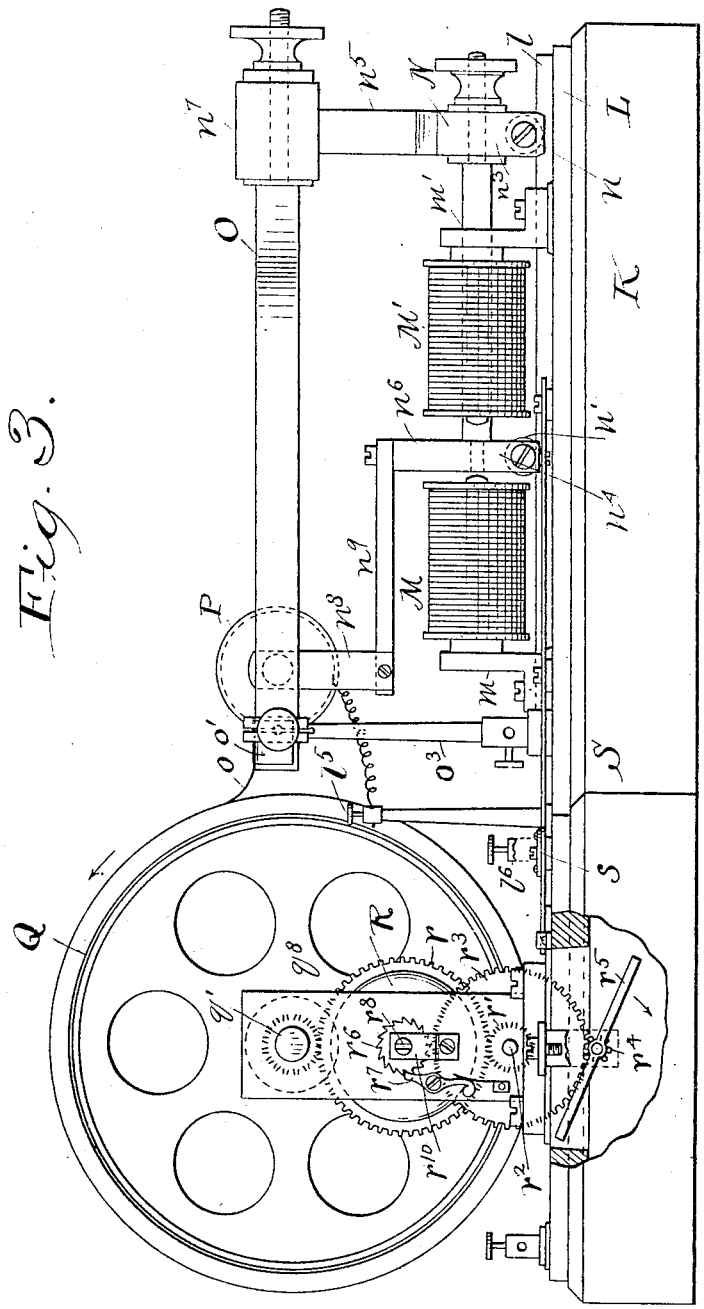

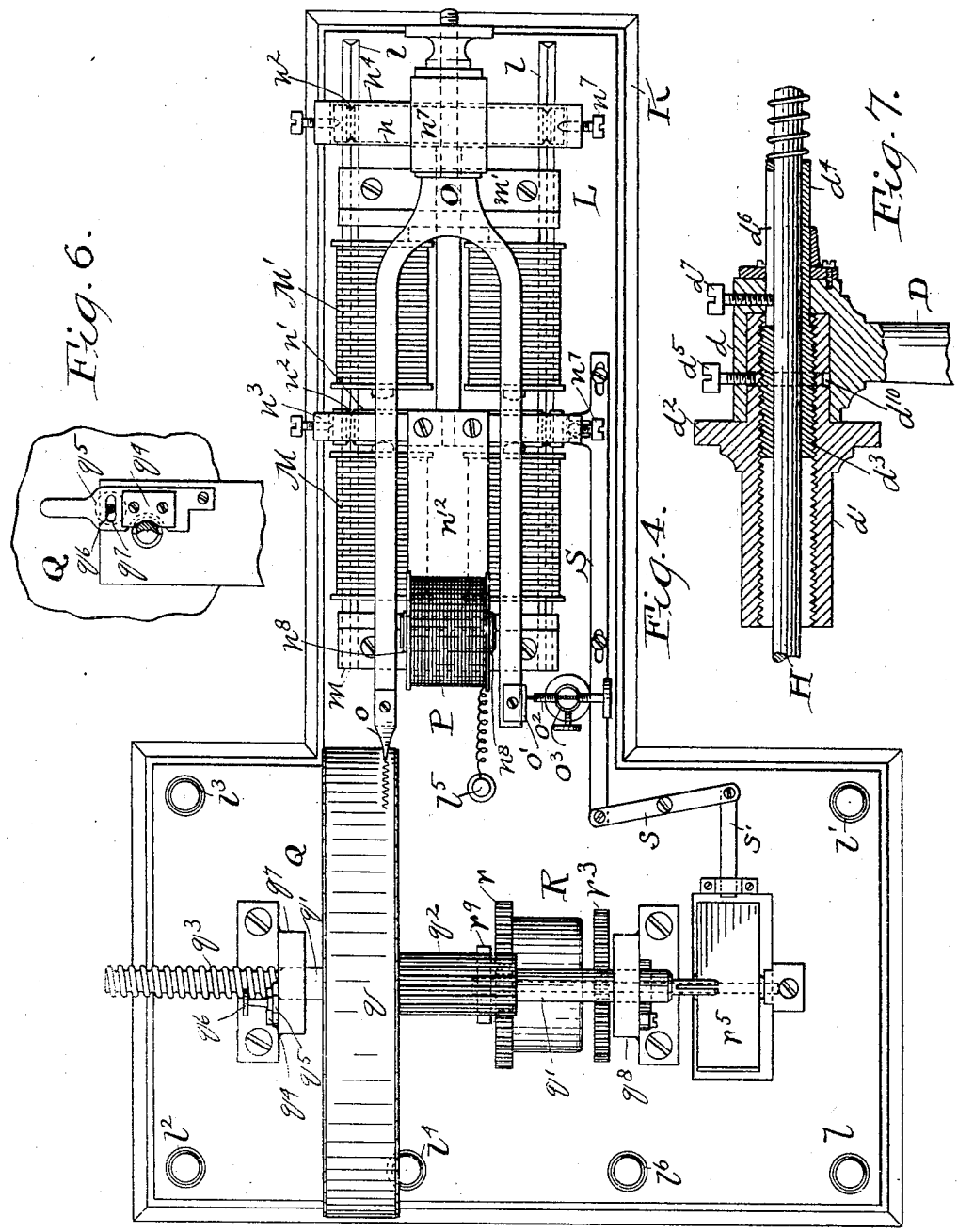

No. 764,350. PATENTED JULY 5, 1904.
A. CIOLFI.
APPARATUS FOR MEASURING THE DURATION OF COMBUSTION OF POWDERS.
APPLICATION FILED JAN. 29, 1904.
NO MODEL. 5 SHEETS—SHEET 4.
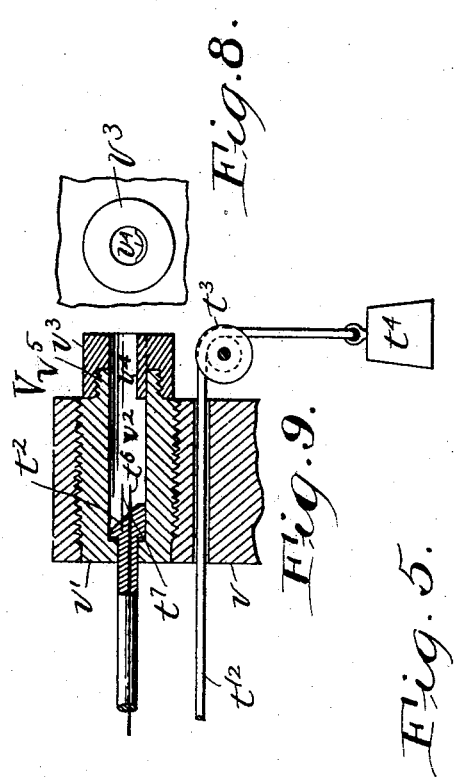
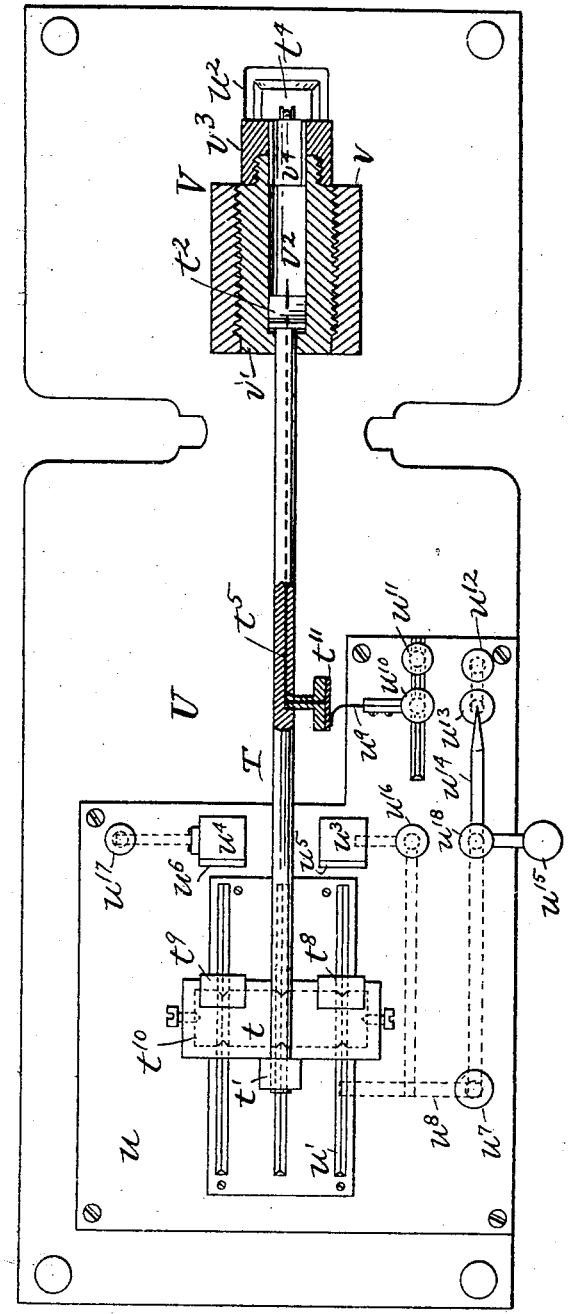
Witnesses:
A. L. Lord.
E. B. Gilchrist.
Inventor.
Antonino Ciolfi
By Thurston & Bates
his attorneys No. 764,350. PATENTED JULY 5, 1904.
A. CIOLFI.
APPARATUS FOR MEASURING THE DURATION OF COMBUSTION OF POWDERS.
APPLICATION FILED JAN. 29, 1904.

No. 764,350. Patented July 5, 1904.

UNITED STATES PATENT OFFICE.

ANTONINO CIOLFI, OF CLEVELAND, OHIO.

APPARATUS FOR MEASURING THE DURATION OF COMBUSTION OF POWDERS.

SPECIFICATION forming part of Letters Patent No. 764,350, dated July 5, 1904.

Application filed January 29, 1904. Serial No. 191,113. (No model.)

*To all whom it may concern:*

Be it known that I, ANTONINO CIOLFI, a subject of the King of Italy, residing at Cleveland, in the county of Cuyahoga and State of Ohio, have invented a certain new and useful Improvement in Apparatus for Measuring the Duration of Combustion of Powders, of which the following is a full, clear, and exact description, reference being had to the accompanying drawings.

My invention relates to apparatus for measuring the duration of combustion of powders of both the ordinary and the smokeless varieties, and has for its object the production of an apparatus that will accomplish this result with accuracy. It may be defined generally as consisting of the combinations of elements set forth in the claims hereto annexed.

Figure 10:
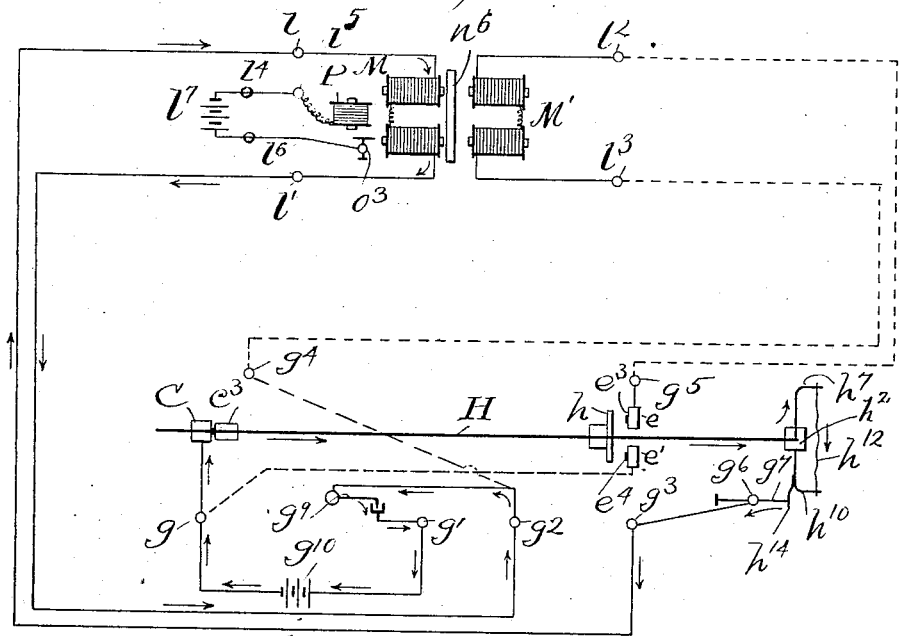
Figure 11:
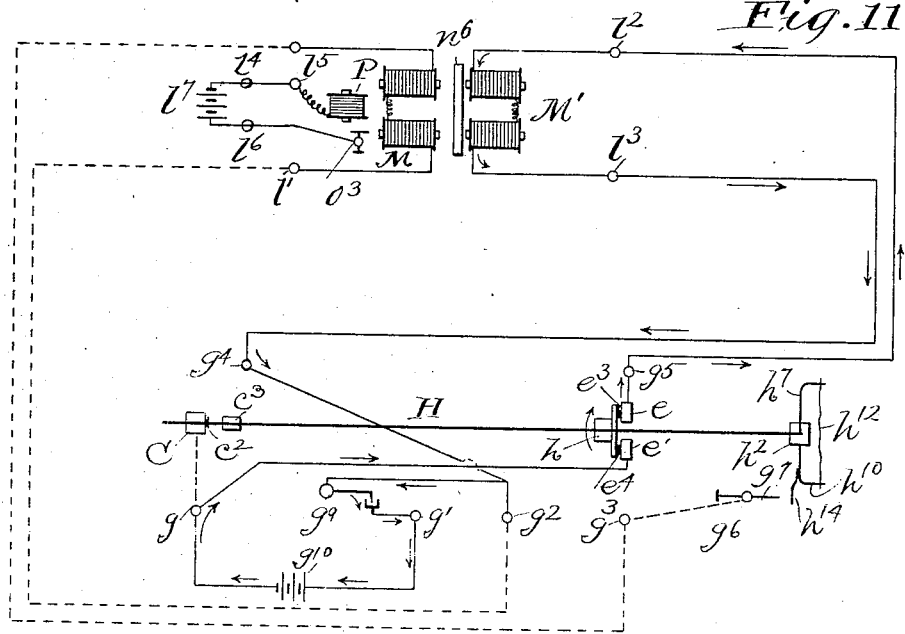

Referring to the drawings, Figure 1 represents a side elevation of a portion of my apparatus in which ordinary powder is burned, the parts being shown in the positions which they will occupy at the time when the apparatus is put into operation. Fig. 2 represents a top plan view of such portion, the parts being shown in the positions which they will occupy when the combustion of the powder is completed. Fig. 3 represents a side elevation of the chronograph or time-measuring portion of my device. Fig. 4 represents a top plan view of the device shown in Fig. 3. Fig. 5 represents a top plan view of a modification of the device illustrated in Figs. 1 and 2, such modification being adapted for the burning of smokeless powder. Fig. 6 represents a detail in elevation of a portion of the mechanism shown in Fig. 4. Fig. 7 represents an enlarged sectional detail of a portion of the device shown in Figs. 1 and 2. Figs. 8 and 9 represent details of a portion of the mechanism shown in Fig. 5, and Figs. 10 and 11 represent diagrammatic plan views of the mechanism shown in Figs. 1 and 2 in combination with the chronograph or timing mechanism.

My apparatus consists, essentially, of two parts, in one of which the phenomenon of combustion of the powder occurs and in the other of which the duration of such combustion is measured and graphically recorded, there being suitable connections between the two parts whereby the operation of the former causes the operation of the latter.

The part of the apparatus wherein the powder is burned will now be described.

The powder-burning mechanism for ordinary powders consists of a suitable support whereon the powder is placed, said support having a normally fixed member or abutment against which the powder, preferably in the form of a large grain, is placed. On the side of the powder opposite said abutment is a movable member or follower having means applied thereto for impelling it toward the abutment. By suitable connections the timing mechanism is set in operation at the instant when the powder is ignited and the operation of such mechanism is stopped at the instant when the combustion of the powder is completed.

Referring to Figs. 1 and 2, A represents the part of my device in which combustion occurs. B designates a base-plate on which are supported four upright metallic members or pillars C D E F, suitably insulated from the base portion, as by an ebonite plate G. The upper portion of the upright or pillar C is provided with an enlarged portion $c$, having an aperture $c'$ therethrough through which freely passes without contact therewith the rod H. A platinum plate $c^2$ is applied to one side of the enlarged portion of the pillar C and extends up nearly into contact with said rod. A nut $c^3$, threaded on the rod H and adapted to bear against the plate $c^2$, places said rod in circuit with the pillar at the time when the powder is ignited.

The upper portion of the pillar D is provided with an enlarged portion $d$, having therein a bore of two diameters, (see Fig. 7,) within the larger of which fits the internally-threaded sleeve $d'$, said sleeve being provided with an operating-flange $d^2$. An externally-threaded sleeve $d^3$ engages with the threads of the sleeve $d'$ and is provided with a reduced portion $d^4$, extending through the reduced bore of the enlargment $d$ of the pillar D. The portion of the sleeve $d'$ within the enlargement $d$ is provided with an annular groove $d^{10}$, with which there engages a screw $d^5$, threaded through said enlargement $d$, whereby the sleeve $d'$ is held in place in the enlargement $d$ and may be rotated without reciprocation. A slot $d^6$ in the reduced portion $d^4$ of the member $d^3$ receives the end of a screw $d^7$, extending through the enlargement $d$, and prevents the said member from being rotated when the sleeve $d'$ is rotated and causes the sleeve to impart to such member a reciprocatory movement. Through the member $d^3$ the rod H freely passes. The upper portion of the pillar E consists of two metallic portions $e\ e'$, connected with but insulated from each other by intermediate portions $e^2$, of ebonite or other suitable non-conducting material. Through the opening formed between the portions $e^2$ and the upper and lower portions $e\ e'$ the rod H passes freely and without contact. Adjacent to the pillar E and between the same and the pillar D the rod H is threaded and provided with an adjustable contact member $h$. Between this member and the member $d^3$ there is provided a spring $h'$ exerting a pressure against the member $h$ and tending to push such member and the rod H, to which it is secured, to the right. The mechanism hereinbefore described as carried by the pillar D permits the spring $h'$ to be adjusted so as to exert any desired amount of pressure against the member $h$. It will be apparent that by rotating the sleeve $d'$ in one direction or the other the tension of the spring $h'$ may be increased or diminished, as desired.

A scale $d^8$ on the portion $d^4$ of the sleeve $d^3$ and an index or pointer $d^9$, secured to the enlargement $d$, will indicate the amount of tension exerted on the spring $h'$ at any time. Attached to the portions $e\ e'$ are the contact-plates $e^3\ e^4$, which may be of platinum or any other desired material.

The pillar F carries at its upper portion a bed or table $f$. This table is for the support and combustion of ordinary powder. At one end of the table there is hinged an abutment-plate $f'$, said plate being hinged to the table, as by suitable straps $f^2$, secured at each side of the plate $f'$ contiguous to the bottom of the same and pivoted to the table $f$ at $f^3$. At one side the plate $f'$ is provided with a recess $f^4$, said recess being bounded at the upper portion by a beveled wall, in engagement with which there is an upwardly-inclined spring-hook $f^5$, which normally holds the plate in the vertical position shown in Fig. 1.

The end of the rod H adjacent to the pillar F terminates in a cylinder $h^2$, of ebonite or other insulating material. Connected with said cylinder by an intervening portion $h^3$ is a vertical follower-plate $h^4$, which may be provided with perforations or slits (not shown) for the escape of gases of combustion evolved from the burning powder. Between the portion $h^3$ and the cylinder $h^2$ is placed a ring of asbestos or other non-heat-conducting material $h^5$. The plate $h^4$ carries at one side thereof and in close proximity to the table $f$ a laterally-projecting arm $h^6$, the purpose of which will be hereinafter explained.

Between the pillar E and the table $f$ and adjacent to the former a shield I is provided, which shield may be suitably supported from the base, as by a standard or bracket $i$. The object of this shield is to protect the mechanism posterior thereto from the effects of the explosion of the powder.

In the space between the plates $f'$ and $h^4$ and on the table $f$ is placed the powder the duration of the combustion of which it is desired to measure. As there is some residue from the combustion of the ordinary or non-smokeless powder, a recess $f^6$ is provided in the plate $f'$ for the reception of such residue, such recess, however, not being of sufficient extent to receive the unconsumed powder.

In order to ignite the powder, the following means are employed: Extending through the ebonite cylinder $h^2$ and in contact with the rod H is the horizontal arm $h^7$. This rod supports a vertical post $h^8$, which may be adjusted in such support by means of a set-screw $h^9$. A similar arm $h^{10}$ projects from the other side of the ebonite cylinder $h^2$, the inner end of said arm being out of contact with the rod H. The arm $h^{10}$ supports a vertically-adjustable post $h^{11}$, similar to the post $h^8$ and adjustable in a similar manner. A platinum wire $h^{12}$ extends between the posts $h^8$ and $h^{11}$, being clamped in place by suitable binding-screws $h^{15}$. Extending from the arm $h^{10}$ is a conducting-plate $h^{13}$, having thereon a contact-piece $h^{14}$, which when the device is about to be set into operation is in contact with the screw $g^7$, adjustably carried by a vertical post $g^6$, said post itself being vertically adjustable, as shown in Fig. 1.

The plate G is provided with suitable binding-posts $g\ g'\ g^2\ g^3\ g^4\ g^5$ for connection with the electric conductors. A mercury switch $g^9$ serves to make and break the circuit when desired.

The binding-post $g$ is connected electrically with the posts C and E, the post $g^6$ with the binding-post $g^3$, and the latter is connected intermediately through the chronograph, the binding-post $g^2$, mercury switch $g^9$, and post $g'$ with the binding-post $g$. A current-producing device (represented conventionally at $g^{10}$, Figs. 10 and 11) may be interposed between the posts $g$ and $g'$.

By the above-described apparatus the powder supported on the table $f$ between the plates $f'$ and $h^4$ may be ignited by means of electricity, and its decrease in size from the institution to the completion of combustion may be followed by means of the rod H, impelled by the spring $h'$.

In order to accurately time the duration of combustion of the powder, I employ the second part of my apparatus. (Illustrated in detail in Figs. 3, 4, and 6.) Referring to said figures, K represents a base-plate on which is supported the timing mechanism, said mechanism being insulated from the base-plate, as by an ebonite bed-plate L.

M and M' designate a pair of oppositely-placed electromagnets supported from the bed-plate by means of brackets $m$ and $m'$, respectively. The base-plate L is provided with triangular tracks $l$, on which is mounted a carriage N. This carriage comprises a pair of rollers $n$ and $n'$, each having annular recesses $n^2$, adapted to fit on the tracks therebelow. The rollers are carried by leg-like extensions $n^3$ $n^4$ of the carriage members $n^5$ $n^6$ and screws $n^7$, which extend through said extensions into conical recesses in the roller ends, this construction permitting the adjustment of the rollers with reference to such legs and the carriage. The carriage member $n^6$ and the legs and roller carried thereby constitute an armature between the two magnets M and M'. The carriage member $n^5$ carries a tuning-fork O, said tuning-fork being secured in an enlarged sleeve portion $n^7$, carried by said standard.

Between the branches of the tuning-fork, near the ends thereof, is placed a vibrator-magnet P, said magnet being supported by legs $n^8$, carried by a plate $n^9$, connected with the armature proper, $n^6$. One branch of the tuning-fork is provided with a stylus $o$ and the other with a platinum plate $o'$, normally in contact with the screw $o^2$, carried by the post $o^3$.

Q designates a drum, having on the periphery thereof any suitable recording device, as a strip of blackened paper $q$, to coact with the stylus $o$, carried by the tuning-fork. This drum is mounted on a shaft $q'$, which shaft may be rotated by means of a spring-drum R, having thereon a gear-wheel $r$, meshing with an elongated pinion $q^2$ on the shaft $q'$. The wheel $r$ also meshes with a pinion $r'$, which drives a shaft $r^2$, carrying a gear-wheel $r^3$, by means of which and a pinion $r^4$ a speed equalizing and retarding fan or paddle $r^5$ is rotated. A ratchet $r^6$ and pawl $r^7$ are provided for the drum-shaft $r^8$. Standards $q^7$ $q^8$ support the shaft of the drum Q, and standards $r^9$ $r^{10}$ support the shaft of the spring-drum.

One end of the drum-shaft $q'$ is provided with a screw-thread $q^3$, coacting with an engaging member or plate $q^4$ in such manner that as the wheel is driven by the drum it will at the same time travel in the direction of its axis, causing the stylus $o$ to make a spiral track from edge to edge of the paper should the stylus and paper be in contact for a sufficient length of time. The member $q^4$ is carried by a pivoted standard $q^5$, whereby when it is desired to return the wheel to its starting position it is only necessary to operate the standard to throw the member $q^4$ out of mesh with the thread $q^3$, whereupon the wheel may be slid back into position. The member $q^4$ may then be placed in mesh with the thread $q^3$ and the drum will be ready for operation again. A slot $q^7$ in said standard and a clamping-screw $q^6$ permit the standard to be secured with the member $q^4$ either in or out of operative relation to the thread $q^3$.

The bed-plate L is provided with the binding-posts $l$, $l'$, $l^2$, $l^3$, $l^4$, $l^5$, and $l^6$. The binding-posts $l$ $l'$ are connected with the winding of the magnet M and the binding-posts $l^2$ $l^3$ with the winding of the magnet M'. These magnets are in two circuits. (Shown in Figs. 10 and 11.) With the parts as represented in the drawings the first circuit, which is made when the powder is ignited, is from the source of current $g^{10}$, through post $g$, pillar C, rod H, arm $h^7$, wire $h^{12}$, arm $h^{10}$, contact $h^{14}$, screw $g'$, post $g^6$, post $g^3$, post L, magnet M, post $l'$, post $g^2$, switch $g^9$, post $g'$, and back to $g^{10}$. The second circuit, which is made when the powder is entirely consumed, is from $g^{10}$ to post $g$, post E, through contact members $e^4$, $h$, $e^3$, post $g^5$, post $l^2$, magnet M', post $l^3$, post $g^4$, post $g^2$, switch $g^9$, post $g'$, and back to $g^{10}$.

The binding-post $l^4$ is connected with the binding-post $l^5$, which in turn is connected with the winding of the vibrator-magnet P.

The inner end of the winding of the magnet P is connected to the metal sides of the same, through which and the plate $n^8$ the frame and the turning-fork connection is made through the plate $o'$, screw $o^2$, post $o^3$, and a suitable connection to the binding-post $l^6$. The vibrator-magnet receives its current from a source shown conventionally at $l^i$, Figs. 10 and 11, independent of that supplied to the magnets M and M', and a suitable switch is provided (not shown) for placing the vibrator in operation shortly before the powder is ignited.

The operation of the device as thus far described is as follows: A grain of powder is placed upon the table $f$ between the vertical plates $f'$ $h^4$. In the case of powder for large guns one grain is of such size as to cause said plates to be spaced a considerable distance apart. The wire $h^{12}$ is adjusted so as best to ignite the powder. In the case of a grain it may be passed through the perforation in the same in contact with one of the walls. The contact member $h$ is so adjusted with reference to the contact-plates $e^3$ $e^4$ that it will contact with such plates when the powder is entirely consumed. This may be done before the placing of the powder on the table $f$ by adjusting said member so that it will bear against said plates at the time when the vertical plates $f'$ and $h^4$ are in contact. The nut $c^3$ is adjusted so as to bear against the plate $c^2$. The circuit may then be made by means of the mercury switch $g^9$, whereupon the current flows in the manner hereinbefore described through the pillar C, rod H, arm $h^7$ to the wire $h^{12}$, which it heats to a sufficient degree to ignite the grain of powder, thence through the arm $h^{10}$, contact-point $h^{14}$, screw $g'$, post $g^6$, post $g^3$, thence to the binding-post $l$, through the coils of the magnet M, back to the binding-post $l'$, thence to the binding-post $g^2$, thence through the mercury switch $g^9$, through the post $g'$, and back to the source, as indicated in Figs. 1, 2, and 4 and the diagram in Fig. 10. By having the current of sufficient strength the platinum wire $h^{12}$ is heated immediately to such a temperature as to ignite the powder. Thereupon the magnet M is energized to draw the armature and carriage to the position shown in Figs. 3, 4, and 10, with the stylus $o$ in contact with the paper $q$. The travel of the carriage, through means of the leg $n^4$, link S, lever $s$, and latch $s'$, releases the fan $r^5$ and permits the drum-spring to rotate the wheel Q. Meanwhile the vibrator-magnet causes the stylus $o$ to trace an undulating path upon the paper $q$, as shown at $q^8$, Fig. 4. During the combustion of the powder the spring $h'$ is forcing the plate $h^4$ toward the plate $f'$ until when the powder has been entirely consumed the plate $h^4$ reaches the plate $f'$, and at the same time the contact member $h$, which has been adjusted for this purpose, strikes the projecting portions $e^3 e^4$. This then establishes the circuit shown in Fig. 11—namely, from the source of current $g^{10}$ to the binding-post $g$, to the pillar E, through $e^4 h e^3$ to binding-post $g^5$, thence to binding-post $l^2$, through windings of electromagnet M' back to binding-post $l^3$, thence to binding-posts $g^4 g^2$, thence to mercury switch $g^9$, and binding-post $g'$ back to source of current $g^{10}$. The electromagnet M' being energized attracts the armature $n^6$ and withdraws the stylus $o$ from contact with the paper $q$. The retraction of the carriage operates the link S and lever $s$ to force the latch $s'$ into position to engage the fan $r^5$ and to stop the rotation thereof and of the drums R and Q.

It will be seen from the above description that my device will accurately time the duration of combustion of the powder placed in the space between the plates $h^4$ and $f'$. The vibration frequency of the tuning-fork being known, it will be only necessary to count the waves or undulations marked on the paper $q$ by the stylus $o$ in order to calculate the length of time occupied in the combustion of the powder.

In the combustion of ordinary or non-smokeless powder more or less sediment is left on the surface on which it is burned. To prevent such sediment from stopping the movement of the follower-plate $h^4$, I have provided the plate $f'$ with the recess $f^6$, hereinbefore referred to, which will ordinarily accommodate such sediment. However, as some sediment may remain between the follower-plate $h^4$ and the portions of the plate $f'$ surrounding such recess I have provided the hinge mechanism and tripping device hereinbefore referred to for said plate $f'$. The hook $f^5$, which supports the plate $f'$ in a vertical position, is so inclined and the lateral arm $h^6$ is so arranged relatively thereto as to depress said hook and permit the plate $f'$ to drop into the position shown in Fig. 2 when the follower-plate $h^4$ is in substantial contact therewith, thereby insuring the contact of the member $h$ with the plates $e^3 e^4$ at the time when the combustion of the powder is completed and the consequent stopping of the time-recording mechanism. The rod H may be provided with a screw or nut $h^{17}$ thereon for convenience of manipulation.

The apparatus hereinbefore described is adapted for the measurement of the duration of combustion of ordinary powders. For smokeless powder, however, in order to ascertain the duration of combustion under the conditions which obtain in actual practice—i. e., within the breech of the gun in which said powders are consumed—it is necessary to modify the construction employed with ordinary powder, particularly as to the space within which the powder is to be burned. In the case of smokeless powder it is necessary to provide a substantially closed receptacle, as were such powder ignited in the open air it would burn comparatively slowly.

In Figs. 5, 8, and 9 I have represented the apparatus to be used with smokeless powder. Referring to said figures, U represents a base-plate having affixed thereto a suitable bed-plate $u$, of insulating material. Near one end of the base-plate is the receptacle V for the smokeless powders, said receptacle consisting of an exterior threaded portion $v'$, having therein a bore $v^2$ and being supported from the base-plate by means of an interiorly-threaded standard $v$, said standard forming a reinforce for the threaded portion $v'$. Within the bore $v^2$ and corresponding to the follower-plate $h^4$ employed with the ordinary powders there is provided a plunger or follower $t^2$, said follower being connected to or formed with a rod T, extending through the rear wall of the receptacle $v'$. The other extremity of the rod T is supported on a carriage $t$, being adjustably secured to the rear portion thereof, as by a nut $t'$. This carriage is supported by a roller $t^{10}$ in the same manner as the carriage N for the timing mechanism. The roller for the carriage $t$ is provided with grooves engaging the triangular tracks $u'$.

Through a portion of its length the rod T is provided with a wire $t^5$, insulated therefrom and having one extremity connected to a contact-plate $t^{11}$. The other extremity of the wire extends through the follower $t^2$ and is there connected with a fine platinum wire $t^6$. A platinum wire $t^7$, which is connected to the follower $t^2$, extends from the end of said follower in close proximity to the wire $t^6$.

A conductor conveying an electric current of the desired strength is connected to the binding-post $u^7$, which is in turn electrically connected with one of the rails $u'$ and the binding-post $u^{16}$ by a suitable conductor $u^8$.

The front of the carriage is provided with contact-plates $t^8$ $t^9$, of any suitable material, as platinum. Opposite these plates are the pillars or projections $u^3$ $u^4$, provided on the faces thereof with the contact-plates $u^5$ $u^6$. By means of the nut $t'$ the distance between the plates $t^8$ $t^9$ and the plates $u^5$ $u^6$ is made equal to the distance between the front of the follower $t^2$ and the rear of the sleeve portion or abutment $v^4$. The pillar or projection $u^3$ is connected with the binding-post $u^{16}$ and the pillar or projection $u^4$ with the binding-post $u^{17}$. With the parts in the position shown in Fig. 5 a contacting stylus or plate $u^9$ bears against the plate $t^{11}$. The stylus or plate $u^9$ is connected with the binding-post $u^{10}$, which is in turn connected with the binding-post $u^{11}$. A switch $u^{14}$, having an operating-handle $u^{15}$, serves to make or break the circuit between the plate $u^{13}$ and the post $u^{18}$, the plate being electrically connected with the post $u^{12}$.

A weight $t^4$ is connected to the carriage $t$ by means of a rope or cord $t^{12}$, extending over a pulley $t^3$. As shown in Fig. 5, this weight may pass freely through an opening $u^2$ in the base-plate U.

In order to form a stop for the forward end of a grain of smokeless powder, an interiorly-threaded sleeve $v^3$ is provided which is adapted to screw onto the exteriorly-threaded portion $v^5$ of the receptacle $v'$. This sleeve has a portion $v^4$ formed therewith, which projects within the bore $v^2$ and forms an abutment or stop for the grain of powder placed in said bore. Where the grain of powder is substantially the diameter of the bore, the sleeve $v^3$ may be unscrewed and the grain inserted in place. The distance between the stop and the follower should be sufficiently great to accommodate the largest grain which it is desired to test.

As will be observed from an inspection of Figs. 5 and 8, the follower $t^2$ is beveled, thereby preventing the gases resulting from the combustion of the powder from interfering with the operation of the follower by the weight $t^4$.

In operation the powder is introduced into the receptacle $v'$ and the platinum terminals $t^6$ $t^7$ are suitably arranged to ignite said powder. In the case of a single grain these terminals may be extended through adjacent perforations and their ends united, or said terminals may be slightly separated, causing the current to arc therebetween when the circuit is made. The vibrator is placed in operation, as noted before in connection with the device employed for burning ordinary powder, and the circuit is then made by means of the switch $u^{14}$ $u^{15}$. The current flows through the rail $u'$, carriage $t$, rod T, platinum terminals $t^7$ $t^6$, wire $t^5$ to plate $t^{11}$, thence through contact-piece $u^9$, posts $u^{10}$ $u^{11}$ to the binding-post $l$, Fig. 6, thereby energizing the magnet M and placing the chronograph in operation. The current returns from binding-post $l'$ to post $u^{12}$ and through $u^{13}$ and $u^{14}$ back to $u^7$. As the powder is burned and the rod H advances toward the abutment $v^4$ the contact between $u^9$ and $t^{11}$ is broken. When the grain is entirely consumed—when the follower $t^2$ strikes the abutment $v^4$—the plates $t^8$ $t^9$ on the carriage $t$ contact with the plates $u^5$ $u^6$. The current then flows through $u^7$ $u^{16}$ $u^3$ $u^4$ $u^{17}$ $l^2$, thence through the electromagnet M', throwing the chronograph out of operation, back through the post $l^3$ and members $u^{12}$ $u^{13}$ $u^{14}$ to $u^7$.

The receptacle V is of a size to accommodate large grains of smokeless powder. By suitably enlarging such receptacle large masses of powder may be burned therein. In fact, the mechanism above described may by slight modification be employed to measure the duration of combustion of such powder in the breech of large ordnance.

In both modifications of the first part of my invention herein described I employ a follower and an abutment between which the powder is placed and ignited, and in both modifications the follower is kept in contact with and follows the powder as its bulk decreases under combustion until it is entirely consumed, the stopping of the movement of the follower being accompanied by the stopping of the operation of the time-recording mechanism.

From the foregoing description, taken with the drawings, it will be apparent that I have produced a device which will accurately determine the duration of combustion of various powders and which will present an accurate graphic representation of the time employed in such combustion.

While I have described my invention in detail, it will be apparent that such details may be modified or departed from more or less without departing from the spirit of my invention, and I do not propose to limit myself to such details except as they may be hereinafter embodied in the claims.

I claim—

1. In an apparatus for determining the duration of combustion of powder, the combination of means for igniting the powder, of timing mechanism, means for setting said mechanism in operation simultaneously with the ignition of the powder, and means for stopping the operation of the timing mechanism simultaneously with the completion of combustion of the powder, substantially as described.

2. In an apparatus for determining the duration of combustion of powder, the combination of means for igniting the powder, of timing mechanism, of means for automatically setting said mechanism in operation simultaneously with the ignition of the powder, and means for automatically stopping the operation of such mechanism simultaneously with the completion of combustion of the powder, substantially as described.

3. In an apparatus for determining the duration of combustion of powder, the combination of means for igniting the powder, of timing mechanism operatively connected with and set in operation by the powder-igniting means simultaneously with the ignition of the powder, and means operating simultaneously with the completion of the combustion of the powder for throwing the timing mechanism out of operation, substantially as described.

4. In an apparatus for determining the duration of combustion of powder, the combination of means including an electric circuit for igniting the powder, of means for making and breaking said circuit, timing mechanism in circuit with said igniting means and adapted to be set in operation when the circuit is made, and means for putting said timing mechanism out of operation when the combustion of the powder is completed, substantially as described.

5. In an apparatus for determining the duration of combustion of powder, the combination of means for igniting the powder, of timing mechanism, of means for setting said mechanism in operation simultaneously with the operation of the powder-igniting means, means including an electric circuit for putting the timing mechanism out of operation, and means for making said circuit simultaneously with the completion of combustion of the powder, substantially as described.

6. In an apparatus for determining the duration of combustion of powder, the combination of means including an electric circuit for igniting the powder, of timing mechanism in circuit with said powder-igniting means and adapted to be put into operation when the circuit is made to ignite the powder, and electrically-operated means for putting said timing mechanism out of operation simultaneously with the completion of combustion of the powder, substantially as described.

7. In an apparatus for determining the duration of combustion of powder, the combination with means for igniting the powder, of timing mechanism set in operation by the igniting means, of a movable member, means for causing said member to follow the powder as it is burned, and means actuated by said movable member for causing the timing mechanism to be thrown out of operation when the powder is entirely consumed, substantially as described.

8. In an apparatus for determining the duration of combustion of powder, the combination of a fixed and a movable member between which the powder is supported in position for burning, of means for igniting the powder, of timing mechanism, of means for placing said mechanism in operation simultaneously with the operation of the powder-igniting means, and means comprising said movable member for throwing said mechanism out of operation simultaneously with the completion of combustion of the powder, substantially as described.

9. In an apparatus for determining the duration of combustion of powder, the combination of a support for the powder, an abutment, a movable member, a follower on said movable member, means for causing the said movable member to exert a pressure on the powder in the direction of the abutment, timing mechanism, means for igniting the powder and for thereupon simultaneously placing the timing mechanism in operation, and means comprising the movable member for placing the timing mechanism out of operation simultaneously with the completion of combustion of the powder, substantially as described.

10. In an apparatus for determining the duration of combustion of powder, the combination of a support for the powder, an abutment carried by said support, a follower between which and the abutment the powder is placed to be ignited, a movable member carrying said follower, means for forcing said follower toward said abutment, timing mechanism, means for simultaneously igniting said powder and setting said timing mechanism into operation, and means comprising the movable member and operable when the follower advances as far as the abutment for throwing the timing mechanism out of operation, substantially as described.

11. In an apparatus for determining the duration of combustion of powder, the combination of igniting means, a support for the powder, an abutment, a follower, a rod attached to the follower, means for impelling said rod and follower toward said abutment, timing mechanism, an electric circuit comprising said rod, igniting means, and timing mechanism for simultaneously igniting the powder and setting said mechanism into operation, and a second electric circuit comprising said rod and said timing mechanism, operable when the follower is impelled as far as the abutment to throw the timing mechanism out of operation, substantially as described.

12. In an apparatus for determining the duration of combustion of powder, the combination of timing mechanism, electrically-operated means for placing said mechanism into and out of operation, a movable and a fixed member between which the powder is supported, electrical igniting means for the powder, said means being in circuit with the means for placing the timing mechanism into operation, separated contacts forming part of a circuit including the means for throwing the timing mechanism out of operation, and means carried by the movable member for bridging the space between said contacts at the time when the powder is completely burned, whereby the timing mechanism is thrown out of operation simultaneously with the completion of the combustion of the powder, substantially as described.

13. In an apparatus for determining the duration of combustion of powder, the combination of two fixed and two movable members, a rod carrying said movable members, means for supporting the powder between one of said fixed and one of said movable members, electrical means for igniting said powder, means for impelling said rod in a direction to cause the last-mentioned movable member to exert a continuous pressure against the burning powder, timing mechanism, electrically-operated means in circuit with said igniting means for placing said timing mechanism in operation, electrically-operated means for throwing said timing mechanism out of operation, the second fixed and movable members forming a make-and-break connection for the circuit comprising the last-mentioned means, the distance between the second fixed and movable members being equal to the distance between the first fixed and movable members, whereby the circuit is made to throw the timing mechanism out of operation when the powder is completely burned, substantially as described.

14. In an apparatus for determining the duration of combustion of powder, the combination, with timing mechanism, of a receptacle for containing the powder to be burned, a fixed member in said receptacle, a movable member in said receptacle between which and said fixed member the powder is placed for burning, means for forcing said movable member toward the fixed member, means for igniting the powder in said receptacle, means for placing the timing mechanism in operation by the operation of the powder-igniting means, and means for throwing the timing mechanism out of operation when the powder is consumed and the movable member comes in contact with the fixed member, substantially as described.

15. In an apparatus for determining the duration of combustion of powder, the combination of a receptacle for containing the powder to be burned, an abutment in said receptacle, a follower in said receptacle between which and said abutment the powder is placed for burning, timing mechanism, means for igniting the powder, and means for automatically placing the timing mechanism into operation by the operation of the igniting means, means for impelling the follower toward the abutment, and means for automatically throwing the timing mechanism out of operation when the powder is consumed and the follower reaches the abutment, substantially as described.

16. In an apparatus for determining the duration of combustion of powder, the combination of a member having a bore within which the powder is burned, a stop or abutment near one end of said bore, a rod extending through the other end of said bore and provided with a follower closely fitting said bore, said follower having a surface beveled toward said abutment, means for impelling said rod and follower toward said abutment, means for igniting the powder, timing mechanism, means for automatically placing said timing mechanism in operation when the powder is ignited, and means for placing said mechanism out of operation when the combustion of the powder is completed, substantially as described.

17. In an apparatus for determining the duration of combustion of powder, the combination of means for igniting the powder, of time-recording mechanism comprising a record-producing and a record-receiving device, means for bringing said devices into operative relation by the ignition of the powder, and means for throwing such devices out of such relation upon the completion of the combustion of the powder, substantially as described.

18. In an apparatus for determining the duration of combustion of powder, the combination of means for igniting the powder, of time-recording mechanism comprising a record-producing and a record-receiving device, means for automatically bringing said devices into operative relation by the operation of the powder-igniting means, and means for automatically throwing such devices out of such relation upon the completion of the combustion of the powder, substantially as described.

19. In an apparatus for determining the duration of combustion of powder, the combination of a receptacle for the powder, a stop or abutment near one end of the bore of said receptacle, a rod extending through the other end of said receptacle and having therein a follower between which and said abutment the powder is placed for burning, a carriage to which the other end of said rod is secured, a fixed contact device between said carriage and said receptacle at a distance from said carriage equal to the distance between the follower and the abutment, means for impelling said rod toward said abutment, means for igniting the powder, timing mechanism adapted to be set in operation by the powder-igniting means, of an electric circuit including said carriage, contact device, and timing mechanism for throwing said mechanism out of operation when the carriage has reached said contact device, substantially as described.

20. In an apparatus for determining the duration of combustion of powder, the combination of means for igniting the powder, of time-recording mechanism, said mechanism comprising a tuning-fork, means for vibrating said fork, a stylus carried by said fork, a recording device, means automatically operated by the powder-igniting means for placing said stylus into operative relation with said recording device, and means for automatically placing said stylus and said recording device out of operative relation on the completion of the combustion of the powder, substantially as described.

21. In an apparatus for determining the duration of combustion of powder, the combination of means for igniting the powder, time-recording mechanism, said mechanism comprising a rotating drum having thereon a record-receiving device, of a record-producing device, means automatically operated by the powder-igniting means for placing said record-producing device into operative relation with said record-receiving device, and means for automatically placing said record-receiving and record-producing devices out of operative relation on the completion of the combustion of the powder, substantially as described.

22. In an apparatus for determining the duration of combustion of powder, the combination of means for igniting the powder, of time-recording mechanism, said mechanism comprising a movable carriage, a record-producing device supported by said carriage, a record-receiving device, means automatically operated by the powder-igniting means for moving said carriage to place said record-producing device into operative relation with the record-receiving device, and means for automatically moving said carriage to place said devices out of operative relation on the completion of the combustion of the powder, substantially as described.

23. In an apparatus for determining the duration of combustion of powder, the combination of means for igniting the powder, of time-recording mechanism comprising a record-receiving device and a record-producing device, a movable carriage on which one of said devices is mounted, of means automatically operated by the powder-igniting means for bringing said devices into operative relation, and means for automatically placing said devices out of operative relation on the completion of the combustion of the powder, substantially as described.

24. In an apparatus for determining the duration of combustion of powder, the combination of electrical means for igniting the powder, a device for producing a record, a device for receiving said record, a carriage for supporting one of said devices, an electromagnet in circuit with said igniting means for operating said carriage to bring said record-receiving and record-producing devices into operative relation coincidently with the ignition of the powder, and means for automatically placing such devices out of operative relation on the completion of the combustion of the powder, substantially as described.

25. In an apparatus for determining the duration of combustion of powder, the combination of means for igniting the powder, of time-recording mechanism, said mechanism comprising a rotating drum having thereon a record-receiving device, a tuning-fork, one member of which is provided with a point or stylus for tracing a record on such receiving device, a carriage on which said tuning-fork is mounted, oppositely-placed magnets between which a portion of the carriage extends to form an armature for said magnets, means for automatically energizing one of said magnets to operate the carriage in a direction to bring the stylus and record-receiving device into contact simultaneously with the ignition of the powder, means for energizing the other magnet simultaneously with the completion of the combustion of the powder to place said stylus out of contact with said record-receiving device, and means for vibrating the stylus-carrying member of said tuning-fork, substantially as described.

26. In an apparatus for determining the duration of combustion of powder, the combination of means for igniting the powder, of time-recording mechanism, said mechanism comprising a rotating drum having thereon a record-receiving device, means for rotating said drum, means for preventing the operation of the said rotating means, a movable device for producing a record on the record-receiving device, means for automatically moving said record-producing device onto operative relation with said record-receiving device simultaneously with the ignition of the powder, means actuated by the movement of said record-producing device to permit the operation of the drum-rotating means, and means for moving said record-producing device out of operative relation with the record-receiving device and for stopping the rotation of the drum carrying the latter device on the completion of the combustion of the powder, substantially as described.

27. In an apparatus for determining the duration of combustion of powder, the combination of means for igniting the powder, of time-recording mechanism comprising a rotating drum having thereon a record-receiving device, a record-producing device, a shaft for rotating said drum, a spring-actuated drum rotating the shaft of the former drum, a shaft for the latter drum, a retarding and speed-equalizing device attached to said last-mentioned shaft, a latch engaging said device to prevent the rotation of its shaft, means for automatically moving the record-producing device into operative relation with the record-receiving device simultaneously with the ignition of the powder, means operated by such movement to retract the latch and permit the rotation of the spring drum-shaft, and means for automatically moving the record-producing device out of operative relation with the record-receiving device on the completion of the combustion of the powder and for causing such movement to operate said latch to engage said retarding and speed-equalizing device, substantially as described.

28. In an apparatus for determining the duration of combustion of powder, the combination of electrical means for igniting the powder, of a record-receiving device, a record-producing device, a carriage for supporting one of said devices, an electromagnet in circuit with said igniting means and arranged to move the carriage to bring said devices into operative relation simultaneously with the ignition of the powder, and a second electromagnet operable on the completion of combustion of the powder to move the carriage to place said devices out of operative relation, substantially as described.

29. In an apparatus for determining the duration of combustion of powder, the combination of means for igniting the powder, of time-recording mechanism comprising a drum having thereon a record-receiving device, a record-producing device adapted to be placed in operative relation with said record-receiving device at the time when the powder is ignited, a shaft for the drum having at one end a screw-thread, means for rotating said shaft, a member adapted to be thrown into mesh with said thread, whereby the rotation of the shaft will cause the drum to travel in the direction of said shaft, and means for throwing said member out of engagement with the thread whereby, on the completion of the record, the drum may be slid back into the starting position, substantially as described.

30. In a timing apparatus, the combination of a record-receiving device, a record-producing device, means for actuating said record-producing device, a carriage whereon one of said devices is mounted, a pair of oppositely-arranged electromagnets, an armature connected with said carriage and extending between said magnets, the arrangement of parts being such that when one of said magnets is energized the carriage is operated to bring said record-receiving and record-producing devices into operative relation and, when the other of said magnets is energized, the carriage is operated to place said devices out of operative relation, substantially as described.

31. In a timing apparatus, the combination of a rotating drum having thereon a record-receiving device, a tuning-fork having on one arm a record-producing device, means for vibrating said arm, a carriage whereon said tuning-fork is mounted, an armature carried by said carriage, a pair of oppositely-arranged magnets between which said armature extends, the arrangement of parts being such that, when one of said magnets is energized the carriage is operated to bring the record-producing device into operative relation with said record-receiving device, and when the other of said magnets is energized, the carriage is operated to place said devices out of operative relation, substantially as described.

32. In a timing apparatus, the combination of a rotating drum having thereon a record-receiving device, a tuning-fork having on one arm a stylus, a vibrator electromagnet for said arm, a carriage whereon said magnet is mounted, a pair of oppositely-arranged carriage-actuating electromagnets, an armature carried by said carriage and extending between said carriage-actuating magnets, the arrangement of parts being such that, when one of said last-mentioned magnets is energized. the carriage is operated to bring the vibrating stylus into operative relation with the record-receiving device and when the other of said magnets is energized, the carriage is operated to place said stylus out of operative relation with said record-receiving device, substantially as described.

33. In a timing apparatus, the combination of a drum having thereon a record-receiving device, a record-producing device mounted on a carriage, a shaft for said drum, a drive-shaft for operating said drum-shaft, a retarding device carried by said drive-shaft, a latch engaging said device to prevent the rotation of the drive-shaft, means for moving the carriage to bring said record-producing device into and out of operative relation with the record-receiving device, and a connection between said carriage and said latch whereby the movement of the carriage to bring the said devices into operative relation releases the retarding device and permits the drive-shaft to rotate the drum-shaft and the movement of said carriage to place said devices out of operative relation causes the latch to engage said retarding device and stop the rotation of said drive and drum shafts, substantially as described.

In testimony whereof I hereunto affix my signature in the presence of two witnesses.

ANTONINO CIOLFI.

Witnesses:
GEO. MELARAGNO,
J. B. HULL.